July 19, 1960     R. J. BUSH ET AL     2,945,390

TRANSMISSION BELT AND THE LIKE

Filed Dec. 24, 1956

INVENTORS
RUSSELL J. BUSH
ORVILLE C. DeWEESE
BY

*THEIR ATTORNEY*

United States Patent Office 2,945,390
Patented July 19, 1960

2,945,390

TRANSMISSION BELT AND THE LIKE

Russell J. Bush and Orville C. De Weese, Dayton, Ohio, assignors to General Motors Corporation, Detroit, Mich., a corporation of Delaware Filed Dec. 24, 1956, Ser. No. 630,298

6 Claims. (Cl. 74—237)

This invention relates to power tranmission devices and in particular to power transmission device such as endless elastomeric belts, rope or sheave drive belts, ropes, cables and the like.

In the use of elastomeric drive belts, such as the conventional V drive belt which operatively connects a drive pulley and a driven pulley, it is desirable in some instances that the belt have a predetermined degree of elastic extendability which may not be provided for in the normal elasticity of the elastomeric material. Thus for example it may be desirable that the driven pulley not be subjected to the full starting torque of the driving member and that the drive belt be sufficiently elastically extendable to absorb the initial shock of the starting torque but that this extendability be specifically limited to permit the drive belt to provide a firm connection between the pulleys. Similarly in connection with lines, ropes and the like for use as a support means or for connecting a driven object to a drawn object it is desirable for the connecting member to be initially elastic to absorb the initial force of the driven object on the drawn object and yet to provide a firm connection between them.

Among the objects of the present invention is to provide a power transmission device in the form of an elastomeric member which is elastically extendable to a predetermined degree. This and other objects may be carried out by embedding an extendable reinforcing member in the elastomeric member which is positioned in less than a fully extended state by a predetermined amount relative to the elastomeric member in a normal nonextended state. In a preferred form of the invention a ball chain in a predetermined state of extension but less than a fully extended state is molded within the elastomeric member.

Further objects and advantages of the present invention will be apparent from the following description, reference being had to the accompanying drawings wherein preferred embodiments of the present invention are clearly shown.

Figures 2, 3:
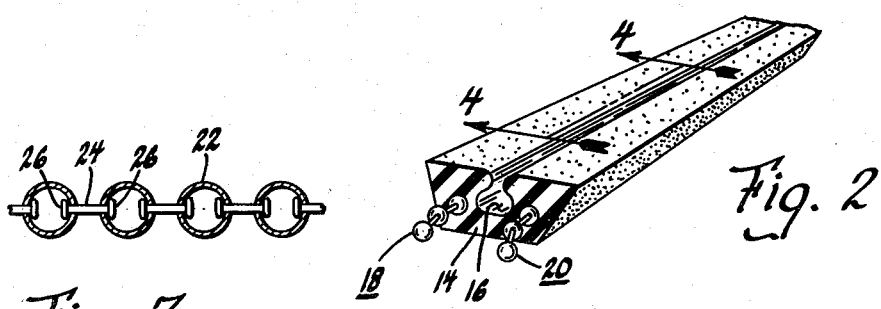
Figure 2 is a perspective view of a portion of an endless V type belt embodying the invention.
Figure 3 is a cross sectional view of a portion of a ball chain.
Figure 6:
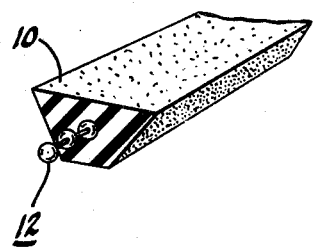
Figure 6 is a perspective view of another form of a V belt embodying the present invention.

A specific form of the invention is shown in the drawings, Figures 2 and 6 of which show portions of endless type V belts of more or less conventional shape. As shown in Figure 6 the belt consists of an elastomeric body 10 having an endless ball chain reinforcing member 12 molded therein, longitudinally thereof. As shown in Figure 2 the belt includes an elastomeric body 14 having a T-shaped groove 16 on the top side thereof for the purpose of providing the belt with a desired degree of lateral flexibility. Embedded in each side of the body 14 are a pair of spaced endless ball-chain reinforcing elements 18 and 20 respectively.

As shown in Figure 3 a ball-chain member involved in the present invention which in itself is well known, consists of a plurality of ball members as for example 22 interconnected by individual link members as for example 24 having enlarged end portions 26 which abut wall portions of the ball members in a well known manner. It will be observed that the ball-chain is contracted by the operation of the link portions 24 moving within the ball members 22, a miximum degree of contraction being achieved when the link members move substantially in their entirety into the ball members and a full extension of the chain being achieved when the enlarged ends of the link portions abut the ball walls. A ball chain may be made to smoothly follow a curved surface by providing openings in the ball members somewhat larger than thickness of the intermediate portions of the links whereby the links may readily pivot relative to the ball members, and providing link members of a suitable length. It is obvious that the degree of contractability of a ball-chain may be readily determined by proper design in the size of the ball members and the length of the link members. For use in connection with the present invention the ball members 22 may be of any shape which permits the link members 24 to move in and out thereof. It is also observed that a ball-chain of this type readily permits the ends thereof to be joined into an endless chain by a mechanical joint thus eliminating the need for welded or soldered joints. Moreover the ball-chain ends may readily be joined to other members by obvious means such as a keyhole slot or the like.

Figures 4, 5:
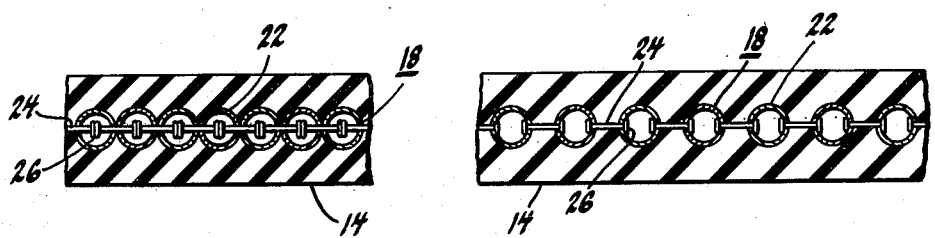
Figure 4 is a cross sectional view taken along line 4—4 of Figure 2.
Figure 5 is a cross sectional view of Figure 4, extended to a maximum point.

In accordance with the present invention the ball-chain member is embedded within an elastomeric member in less than a fully extended state as is illustrated in Figure 4 wherein the chain is molded in a state of maximum contraction and the elastomeric body is in a normal nonextended condition. The elastomeric member may be elongated or stretched until the enlarged ends of the links abut the ball walls as shown in Figure 5. Thus for example using a commercial 3/16 inch ball-chain as a reinforcing member which is embedded in the elastomeric body in a state of maximum contraction, the elastomeric body may be elongated 27½ percent. It is apparent that a variation in the degree of the state of contraction in which this ball-chain is embedded will produce an elastic stretchability of the elastomeric member of from zero to 27½ percent.

Figure 1:
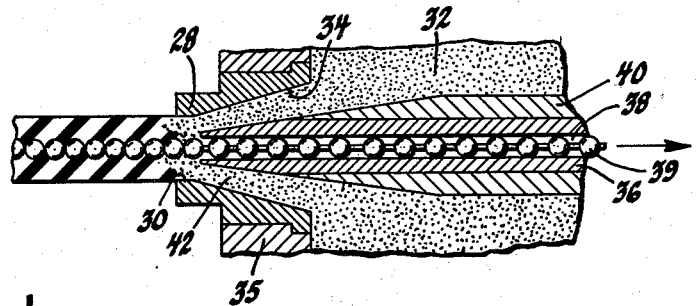
Figure 1 is a fragmentary view of a tuber whereby a ball chain is molded within an elastomeric member in accordance with the present invention.

The elastomeric members of the present invention may be made using a more or less conventional extrusion apparatus or a tuber, a portion of which is shown in Figure 1 and in itself is well known in the art. It includes a die 28 having an orifice 30 of a desired cross section through which a plastic material 32 may be forced and extruded to produce after curing an elastomeric article of the desired cross section. The die 28 has inwardly tapered surfaces 34 whereby the plastic material 32 under pressure may be readily forced to the die orifice. The die 28 is supported by a housing or extrusion head 35 which is attached to or includes a casing means (not shown) for confining the plastic material 32 which is fed to the die under pressure. Extending horizontally within the die 28, to a point short of the orifice 30 and positioned vertically at a point or points at which it is desired to provide reinforcing members, is a guide member 36 having a longitudinal passage 38 through which the ball-chain 39 is fed through die orifice simultaneously with the plastic material. The guide member 36 is adjustably supported by a spindle 40, the end of which together with the adjacent discharge end of the guide member 36 are tapered inwardly in the direction of the orifice to provide in cooperation with the die member 28, an annular conical passage 42 for admitting plastic material to the die orifice. As shown in Figure 1 plastic material forced through the die orifice is molded about the ball-chain and the ball-chain is drawn into the orifice by the longitudinal movement of the extruded elastomeric material. As the plastic material is molded about the ball-chain at the orifice 30 the pressure of the plastic material advancing from the conical passage 42 forces the ball members of the ball-chain forward in the direction of the flow of the plastic material whereby the ball members are molded or embedded within the extruded elastomeric member in side by side relation. It has been found that a desired spacing of the ball members may be achieved in the finally extruded product by applying a suitable amount of tension on the ball chain 39 in a direction opposite to the direction of movement of the extruded elastomeric strip, as indicated by the arrow. The amount of tension to be applied may be readily determined experimentally and will of course vary with the extrusion pressure of the elastomeric material, the size of the ball members, the degree of ball spacing desired in the final product, and the specific design characteristics of the extrusion apparatus used. After the extrusion operation the elastomer is suitably cured as is conventional in the art.

In the elastomeric power transmission devices, elongation is provided substantially by the inherent elasticity of the elastomeric material until the enlarged link ends of the ball-chain members abut the ball walls since as may be observed in reference to Figure 4, the enlarged link ends move entirely within the ball voids. When the link ends abut the ball walls, further elongation of elastomeric member is abruptly stopped, thus providing an elastomeric member having a predetermined and specific limit to elongation. Other reinforcing members such as link chains may be used in the present invention, however the ball-chain is preferred because of the ease with which an elastomeric article having desired characteristics may be made as indicated above.

By the term "elastomer" used herein is meant any rubber-like material having suitable elastic properties as for example natural rubber, butadiene-styrene copolymers, butadiene-acrylonitrile copolymer, polychloroprene, butyl rubber, polysulfide rubbers, various suitably compounded polyisocyanate-modified polyesters and other organic polymers having reactive hydrogen groups, and suitable mixtures of such materials.

The elastomeric articles of the present invention lend themselves to a wide variety of uses. Examples include the aforementioned V belt drives, particularly for use with large motors using multiple belts where a part of the weight of the motor is carried by the belts while in operation, and motors having a grooved multiple pulley driving compressors or the like with the belts working on relatively flat fly wheels or pulleys, baggage rack cords as may be used on busses and railway passenger cars, the rope cord on the back of the front seat of an automobile, hand support loops on busses and trolleys, and tow ropes and similar devices.

While the embodiments of the present invention as herein disclosed constitute preferred forms, it is to be understood that other forms might be adopted.

What is claimed is as follows:

1. An article of manufacture comprising, a body of elastomeric material adapted at least to be flexible longitudinally, a ball-chain reinforcing means embedded in said elastomeric body and including a plurality of hollow members as well as a plurality of individual link members having enlarged end portions adapted to fit inside said hollow members which are interconnected in pairs relative to each other by said link members, said enlarged end portions being free of encumbrance by said elastomeric body which can be elongated resiliently to limits governed by engagement of said end portions relative to said hollow members adjacent to openings in said hollow members through which said link members project.

2. The article of manufacture of claim 1 in which said hollow members are substantially spherically-shaped balls substantially free of elastomeric material inside said balls, said link members being longitudinally slidable relative to said balls which are loosely fitted relative to said link members in alternate relationship to form said ball-chain reinforcing means therewith, said reinforcing means being extendable together with said elastomeric body.

3. An article of manufacture comprising an elastomeric member in a continuous belt-like length having a ball-chain reinforcing member including hollow portions and interconnecting telescoping links embedded therein, said ball chain being positioned within said elastomeric member in less than a fully extended state when said elastomeric member is in a normal unextended state such that ends of said links are located in said hollow portions free of direct contact relative to said elastomeric member that is extendable to within limits determined by said ball chain.

4. An endless elastomeric power transmission belt comprising a longitudinally extendable strip portion having at least one endless ball-chain member embedded therein, said ball-chain including free telescopable elements positioned within said elastomeric belt in less than a fully extended state when said strip portion is in a normal unextended state.

5. The belt of claim 3 wherein said telescopable elements of said ball-chain have an elastomer molded therearound as said strip portion, said ball-chain being embedded in said elastomer in less than a fully extended state when said elastomer is in a normal nonextended state such that said strip portion as well as said ball-chain are extendable to within limits determined by said elements of said ball-chain.

6. An endless power transmission belt, comprising, a plurality of hollow balls interconnected by links to form a ball-chain having an elastomer molded therearound, said ball chain being positioned relative to said elastomer so that said chain is in less than a fully extended state when said elastomer is in a normal nonextended state, said hollow balls having an interior substantially free of elastomer so that ends of said links are free of encumbrance to permit resilient stretching and contraction of the elastomer within limits determined by balls and links of said chain.

References Cited in the file of this patent

UNITED STATES PATENTS

| | | |
|---|---|---|
| 408,314 | Moore | Aug. 6, 1889 |
| 1,980,437 | Reeves | Nov. 13, 1934 |
| 2,267,038 | Mix | Dec. 23, 1941 |
| 2,401,550 | Cook | June 4, 1946 |
| 2,452,752 | Hartranft | Nov. 2, 1948 |
| 2,555,190 | Fuchslocher | May 29, 1951 |
| 2,669,754 | Chadbourne | Feb. 23, 1954 |
| 2,763,124 | Greene | Sept. 18, 1956 |